United States Patent Office 3,160,663
Patented Dec. 8, 1964

3,160,663
PROCESS FOR THE PRODUCTION OF
CYCLOHEXANONE OXIME
Wallace F. Runge, Terre Haute, Ind., assignor to Commercial Solvents Corporation, New York, N.Y., a corporation of Maryland
No Drawing. Filed Nov. 9, 1961, Ser. No. 151,398
8 Claims. (Cl. 260—566)

My invention relates to the production of cyclohexanone oxime. More particularly my invention relates to a method for obtaining increased amounts of cyclohexanone oxime from the reduction product of nitrocyclohexane.

Cyclohexanone oxime, an intermediate used in the preparation of caprolactam, is prepared by the reduction of nitrocyclohexane in the presence of a suitable reduction catalyst. Such processes and catalysts are shown in U.S. Patents 2,711,427, 2,768,206, 2,886,596, and copending U.S. patent application Serial No. 113,625 by Vernon V. Young, filed May 31, 1961, and now abandoned. Generally these procedures consist of catalytically hydrogenating nitrocyclohexane under pressures ranging from about 300 to about 1,000 p.s.i. at temperatures ranging from about 50 to about 150° C. in the presence of an inert organic solvent such as the lower alcohols. In all known reduction procedures, however, conversion of nitrocyclohexane to cyclohexanone oxime is not complete. Besides cyclohexanone oxime, the reaction mixture also contains major amounts of cyclohexylamine, cyclohexylhydroxylamine, and nitrocyclohexane.

I have now discovered a process whereby increased amounts of cyclohexanone oxime can be obtained from the reduction procedure of nitrocyclohexane without first recycling unreacted nitrocyclohexane for further reduction. According to my process, not only is additional cyclohexanone oxime produced, but also, the amount of cyclohexylhydroxylamine in the reaction mixture is reduced. My process is both economical and efficient and results in substantial savings in the production of caprolactam.

Generally my process consists of blanketing the reduction mixture of nitrocyclohexane with a non-oxidizing gas and subsequently heating the blanketed reduction mixture in the presence of a suitable reduction catalyst to from about 125° C. to about 175° C. for a period of time sufficient to produce additional amounts of cyclohexanone oxime.

Any suitable reduction catalyst which will reduce nitrocyclohexane such as the ones described in the previously referred to patents and patent application, can be utilized. However, I prefer to use the silver oxide, zinc oxide, chromium oxide, calcium oxide catalyst described in copending patent application U.S. Serial No. 113,625. This catalyst is prepared by calcinating a silver-containing compound such as silver acetate or silver oxide with a zinc-containing compound such as zinc acetate, a chromium-containing compound such as chromium oxide, and a calcium-containing compound such as calcium oxide.

Time periods required for production of maximum amounts of cyclohexanone oxime will naturally vary depending on the nitrocyclohexane reduction mixture and the temperatures utilized in my process. Generally I have found that periods of time ranging from one-half hour to 24 hours allow maximum production of cyclohexanone oxime.

Any suitable inert and non-oxidizing gas can be utilized in my process. Examples of such gases are, nitrogen, argon, neon, etc., and the like. As previously stated, temperatures ranging from about 125° C. upward to about 175° C. can be utilized in my process. I have found for most purposes, however, that it is preferable to utilize temperatures ranging from about 135 to about 170° C.

The following examples serve to illustrate my process. It is not intended, however, that my invention should be limited to the exact procedures, specific apparatus, or particular gases set forth therein; for I intend to include all equivalents obvious to the art.

*Example I*

To a sealed reaction vessel was charged a reaction mixture produced by the reduction of nitrocyclohexane, the said mixture containing 0.0616 mole of cyclohexylamine, 0.1975 mole of cyclohexylhydroxylamine, 1.0200 moles of cyclohexanone oxime, and 0.6080 mole of nitrocyclohexane. To the mixture were then added a 2.5-gram portion of silver oxide, zinc oxide, chromium oxide, calcium oxide catalyst prepared according to the procedure of U.S. patent application Serial No. 113,625. Air was evacuated from the vessel and the charge was then blanketed with nitrogen. The blanketed material was then heated to 160° C. and held at that temperature for 16 hours. At the end of the 16-hour period the mixture was found to contain 0.126 mole of cyclohexylamine, 0.009 mole of cyclohexylhydroxylamine, 1.215 moles of cyclohexanone oxime, and 0.535 mole of nitrocyclohexane, thus demonstrating a gain in cyclohexanone oxime of approximately 20%.

*Example II*

The procedure of Example I was carried out with the exception that a temperature of 150° C. and a time period of 12 hours were utilized. At the end of the 12-hour period a gain in cyclohexanone oxime of approximately 22% was obtained.

Now having described my invention, what I claim is:

1. A process for the production of cyclohexanone oxime which consists essentially of hydrogenating nitrocyclohexane to form a hydrogenation mixture containing cyclohexanone oxime, nitrocyclohexane, cyclohexylamine, and cyclohexylhydroxylamine, subsequently blanketing the hydrogenation mixture with an inert gas, and heating the blanketed mixture in the presence of a catalyst capable of reducing nitrocyclohexane to from about 125 to about 175° C. for a period ranging from about one-half hour to about 24 hours whereby additional cyclohexanone oxime is produced and the amount of cyclohexylhydroxylamine in said hydrogenation mixture is reduced.

2. The process of claim 1 wherein the temperature ranges from 135 to about 170° C.

3. The process of claim 1 wherein the gas is nitrogen.

4. The process of claim 1 wherein the nitrocyclohexane-reducing catalyst is a silver oxide, chromium oxide, zinc oxide, calcium oxide catalyst.

5. A process for the production of cyclohexanone oxime from mixtures containing cyclohexanone oxime, cyclohexylamine, nitrocyclohexane, and cyclohexylhydroxylamine, which comprises blanketing the mixture with an inert gas and heating the mixture in the presence of a nitrocyclohexane reduction catalyst to from about 125° C. to about 175° C. whereby additional cyclohexanone oxime is produced and the amount of cyclohexylhydroxylamine is reduced in said mixture.

6. The process of claim 5 wherein the temperature ranges from about 135 to about 170° C.

7. The process of claim 5 wherein the gas is nitrogen.

8. The process of claim 5 wherein the nitrocyclohexane reducing catalyst is a silver oxide, chromium oxide, zinc oxide, calcium oxide catalyst.

References Cited in the file of this patent

UNITED STATES PATENTS

| | | |
|---|---|---|
| 2,711,427 | Christian | June 21, 1955 |
| 2,762,844 | Kaarsemaker | Sept. 11, 1956 |
| 2,768,206 | Kaarsemaker | Oct. 23, 1956 |